(12) United States Patent
Herrmann et al.

(10) Patent No.: US 6,881,255 B2
(45) Date of Patent: Apr. 19, 2005

(54) PIGMENT PREPARATIONS

(75) Inventors: Udo Herrmann, Dormagen (DE); Dirk Pfützenreuter, Burscheid (DE); Josef Witt, Leverkusen (DE); Hans-Jürgen Hartrumpf, Leverkusen (DE)

(73) Assignee: Bayer Chemicals AG, Leverkusen (DE)

(*) Notice: Subject to any disclaimer, the term of this patent is extended or adjusted under 35 U.S.C. 154(b) by 0 days.

(21) Appl. No.: 10/792,492

(22) Filed: Mar. 3, 2004

(65) Prior Publication Data

US 2004/0176499 A1 Sep. 9, 2004

(30) Foreign Application Priority Data

Mar. 5, 2003 (DE) .......................................... 103 09 819

(51) Int. Cl.[7] .......................... C09B 67/20; C09D 11/00
(52) U.S. Cl. ...................... 106/503; 106/413; 106/420; 106/447; 106/453; 106/460; 106/476; 106/479; 106/480; 106/493; 106/494; 106/495; 106/496; 106/497; 106/498; 106/499; 523/160; 523/161
(58) Field of Search ................................ 106/420, 447, 106/453, 460, 476, 479, 480, 493, 494, 495, 496, 497, 498, 499, 503, 413; 523/160, 161

(56) References Cited

U.S. PATENT DOCUMENTS

| 4,789,400 A | 12/1988 | Solodar et al. ................ 106/22 |
| 5,017,644 A | 5/1991 | Fuller et al. ................ 524/612 |
| 5,554,739 A | 9/1996 | Belmont ..................... 534/885 |
| 5,888,400 A | 3/1999 | Tholema et al. ............. 210/644 |
| 5,922,118 A | 7/1999 | Johnson et al. ............ 106/31.6 |
| 6,156,720 A | 12/2000 | Boeckh et al. .............. 510/475 |
| 6,300,304 B1 | 10/2001 | Boeckh et al. .............. 510/475 |
| 6,332,943 B1 | 12/2001 | Herrmann et al. .......... 156/277 |
| 6,478,866 B1 | 11/2002 | Nyssen et al. .............. 106/503 |
| 6,538,048 B1 | 3/2003 | Erdtmann et al. .......... 523/160 |
| 6,586,498 B1 | 7/2003 | Erdtmann et al. .......... 523/160 |
| 6,596,073 B1 * | 7/2003 | Nyssen et al. .............. 106/499 |
| 6,811,601 B1 * | 11/2004 | Borzyk et al. .............. 106/499 |
| 2004/0035326 A1 | 2/2004 | Borzyk et al. .............. 106/499 |

FOREIGN PATENT DOCUMENTS

WO   WO01/92421 A1 * 12/2001

OTHER PUBLICATIONS

Text Chem. Color, Band 19 (8), pp. 23–29, Aug. 1987, B. Smith and E. Simonson, "Ink Jet Printing for Textiles".
Text Chem. Color, vol. 21 (6) pp. 27–32, Jun. 1989, L.A. Graham "Ink Jet Systems for Dyeing and Printing of Textiles".
Farbmessung BAYER Farben Revue, Sonderheft 3/2D (1986); A. Brockes, D. Strocka, A. Berger–Schunn "Farbmessung in der textilindustrie", (no month).

* cited by examiner

*Primary Examiner*—Anthony J. Green
(74) *Attorney, Agent, or Firm*—Dederico van Eyl; Jennifer R. Seng

(57) ABSTRACT

Pigment preparations comprising
a) at least one pigment,
b) at least one polyethyleneimine which is alkoxylated, especially ethoxylated and propoxylated and/or butoxylated, and
c) at least one condensation product based on
  A) sulphonated aromatics,
  B) aldehydes and/or ketones and optionally
  C) one or more compounds selected from the group consisting of nonsulphonated aromatics, urea and urea derivatives.

8 Claims, No Drawings

PIGMENT PREPARATIONS

The present invention relates to novel pigment preparations, processes for their production and also their use, especially for producing recording fluids for ink jet printing.

Aqueous printing inks for ink jet printing based on water-soluble organic dyes as well as organic color pigments are well known in the art. Pigments provide the prints with a significantly higher light and ozone stability than dyes. The most important pigment for this application is carbon black in that carbon black ink jet prints are document-fast, i.e. light stable and water resistant, unlike black dyes.

However, the wider use of pigment inks is in some cases prevented by their dispersion properties. Pigment particles can agglomerate in a non-optimal dispersion. This changes the particle size distribution, it becomes inhomogeneous and this can give rise to start-of-print problems and print quality decreases.

Carbon black particles can be encapsulated to reduce their tendency to agglomerate, as described in "Color Pigment Encapsulation" by Robert Lustenader (ink jet world January 1995, pp 75).

A further approach is to functionalize the pigments (U.S. Pat. No. 5,554,739 and U.S. Pat. No. 5,922,118). However, the disadvantage is the increased tendency to migrate and the associated lower waterfastness.

It is an object of the present invention to provide pigment preparations having little tendency to agglomerate, especially having good start-of-print performance.

This object is achieved by pigment preparations comprising
- a) at least one pigment,
- b) at least one polyethyleneimine which is alkoxylated, especially ethoxylated and propoxylated and/or butoxylated, and
- c) at least one condensation product based on
  - A) sulphonated aromatics,
  - B) aldehydes and/or ketones and optionally
  - C) one or more compounds selected from the group consisting of nonsulphonated aromatics, urea and urea derivatives.

Useful pigments include not only inorganic pigments but also organic pigments.

"Organic pigments", as used herein, comprehends vat dyes as well. It will be appreciated that the pigment preparations can also include mixtures of various organic or various inorganic pigments or organic and inorganic pigments.

Examples of suitable pigments (a) include:

Organic Pigments:

Monoazo Pigment:

C.I. Pigment Brown 25;

C.I. Pigment Orange 5, 13, 36 and 67;

C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251;

C.I. Pigment Yellow 1, 3, 73, 74, 65, 97, 151 and 183;

Disazo Pigments:

C.I. Pigment Orange 16, 34 and 44;

C.I. Pigment Red 144, 166, 214 and 242;

C.I. Pigment Yellow 12, 13, 14, 16, 17, 81, 83, 106, 113, 126, 127, 155, 174, 176 and 188, Anthanthrone Pigments:

C.I. Pigment Red 168

(C.I. Vat Orange 3);

Anthraquinone Pigments:

C.I. Pigment Yellow 147 and 177;

C.I. Pigment Violet 31;

Anthrapyrimidine Pigments:

C.I. Pigment Yellow 108

(C.I. Vat Yellow 20),

Quinacridone Pigments:

C.I. Pigment Red 122, 202 and 206;

C.I. Pigment Violet 19;

Quinophthalone Pigments:

C.I. Pigment Yellow 138;

Dioxazine Pigments:

C.I. Pigment Violet 23 and 37,

Flavanthrone Pigments:

C.I. Pigment Yellow 24;

(C.I. Vat Yellow 1);

Indanthrone Pigments:

C.I. Pigment Blue 60;

(C.I. Vat Blue 4)

and 64 (C.I. Vat Blue 6);

Isoindoline Pigments:

C.I. Pigment Orange 69;

C.I. Pigment Red 260;

C.I. Pigment Yellow 139 and 185;

Isoindolinone Pigments:

C.I. Pigment Orange 61;

C.I. Pigment Red 257 and 260;

C.I. Pigment Yellow 109, 110, 173 and 185;

Isoviolanthrone Pigments:

C.I. Pigment Violet 31;

(C.I. Vat Violet 1);

Metal Complex Pigments:

C.I. Pigment Yellow 117, 150 and 153;

C.I. Pigment Green 8;

Perinone Pigments:

C.I. Pigment Orange 43;

(C.I. Vat Orange 7);

C.I. Pigment Red 194;

(C.I. Vat 15);

Perylene Pigments:

C.I. Pigment Black 31 and 32;

C.I. Pigment Red 123, 149, 178, 179, (C.I. Vat Red 23), 190 and 240;

C.I. Pigment Violet 29;

Phthalocyanine Pigments:

C.I. Pigment Blue 15, 15:1, 15:2, 15:3, 15:4, 15:6 and 16;

C.I. Pigment Green 7 and 36;

Pyranthrone Pigments:

C.I. Pigment Orange 51;

C.I. Pigment Red 216;

(C.I. Vat Orange 4);

Thioindigo Pigments:

C.I. Pigment Red 88 and 181;

(C.I. Vat Red 1);

C.I. Pigment Violet 38;

(C.I. Vat Violet 3);

Triarylcarbonium Pigments:
C.I. Pigment Blue 1, 61 and 62;
C.I. Pigment Green 1;
C.I. Pigment Red 81, 81:1 and 169;
C.I. Pigment Black 1 (aniline black);
C.I. Pigment Yellow 101 (aldazine yellow);
C.I. Pigment Brown 22.
Vat dyes (apart from those already mentioned above):
C.I. Vat Yellow 2, 3, 4, 5, 9, 10, 12, 22, 26, 33, 37, 46, 48, 49 and 50;
C.I. Vat Orange 1, 2, 5, 9, 11, 13, 15, 19, 26, 29, 30 and 31;
C.I. Vat Red 2, 10, 12, 13, 14, 16, 19, 21, 31, 32, 37, 41, 51, 52 and 61;
C.I. Vat Violet 2, 9, 13, 14, 15, 17 and 21;
C.I. Vat Blue 1 (C.I. Pigment Blue 66), 3, 5, 10, 12, 13, 14, 16, 17, 18, 19, 20, 22, 25, 26, 29, 30, 31, 35, 41, 42, 43, 64, 65, 66, 72 and 74;
C.I. Vat Green 1, 2, 3, 5, 7, 8, 9, 13, 14, 17, 26, 29, 30, 31, 32, 33, 40, 42, 43, 44 and 49;
C.I. Vat Green 1, 2, 3, 5, 7, 8, 9, 13, 14, 17, 26, 29, 30, 31, 32, 33, 40, 42, 43, 44 and 49;
C.I. Vat Brown 1, 3, 4, 5, 6, 9, 11, 17, 25, 32, 33, 35, 38, 39, 41, 42, 44, 45, 49, 50, 55, 57, 68, 72, 73, 80, 81, 82, 83 and 84,
C.I. Vat Black 1, 2, 7, 8, 9, 13, 14, 16, 19, 20, 22, 25, 27, 28, 29, 30, 31, 32, 34, 36, 56, 57, 58, 63, 64 and 65;
Inorganic Pigments:
White Pigments:
Titanium dioxide (C.I. Pigment White 6), zinc white, pigment grade zinc oxide; zinc sulphide, lithopone; lead white;
Black Pigments:
Iron oxide black (C.I. Pigment Black 11), iron manganese black, spinel black
(C.I. Pigment Black 27); carbon black
(C.I. Pigment Black 7);
Chromatic Pigments:
Chromium oxide, Chromium oxide hydrate green; chrome green (C.I. Pigment Green 48); cobalt green (C.I. Pigment Green 50); ultramarine green;
cobalt blue (C.I. Pigment Blue 28 and 36); ultramarine blue; iron blue (C.I. Pigment Blue 27); manganese blue; ultramarine violet; cobalt and manganese violet;
Iron oxide red (C.I. Pigment Red 101); cadmium sulphoselenide (C.I. Pigment Red 108); molybdate red (C.I. Pigment Red 104); ultramarine red;
Iron oxide brown, mixed brown, spinel and corundum phases (C.I. Pigment Brown 24, 29 and 31), chrome orange; iron oxide yellow (C.I. Pigment Yellow 42);
nickel titanium yellow (C.I. Pigment Yellow 53; C.I. Pigment Yellow 157 and 164);
chromium titanium yellow; cadmium sulphide and cadmium zinc sulphide (C.I. Pigment Yellow 37 and 35); chrome yellow (C.I. Pigment Yellow 34), zinc yellow, alkaline earth metal chromates; Naples yellow; bismuth vanadate (C.I. Pigment Yellow 184);
Interference Pigments:
metal effect pigments based on coated metal platelets; pearl lustre pigments based on metal-oxide-coated mica platelets; liquid crystal pigments;
Preferred pigments in this context are monoazo pigments (especially laked BONS pigments, Naphtol AS pigments), disazo pigments (especially diaryl yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments and carbon blacks (especially gas or furnace blacks).

Examples of particularly preferred pigments are specifically: C.I. Pigment Yellow 138, C.I. Pigment Red 122, C.I. Pigment Violet 19, C.I. Pigment Blue 15:3 and 15:4, C.I. Pigment Black 7, C.I. Pigment Orange 5, 38 and 43 and C.I. Pigment Green 7.

Particularly preferred pigments are those of the type of carbon blacks which have a pH≦4.5 in a 5% aqueous slurry, such as Spezialschwarz 4, Spezialschwarz 4a, Spezialschwarz 5, Spezialschwarz 6, Spezialschwarz 100, Spezialschwarz 250, Spezialschwarz 350, Spezialschwarz 550, and also pigment grade carbon blacks of the types FW 200, FW 2, FW 2V, FW 285, FW 1, FW 18, S 160, S 170, Printex grades V, 140 U, 140 U, Pigment Yellow 150, Pigment Yellow 74, Pigment Blue 15:3, Pigment blue 15:2, Pigment blue 15:1, Pigment Red 122.

In a preferred embodiment, the alkoxylated polyethyleneimine of component b) is a polyethyleneimine which has first been propoxylated or butoxylated and then ethoxylated.

Preference is given to polyethyleneimines (b) which have 1 to 10 mol, especially 1 to 6 mol and particularly 2 to 5 mol of propylene oxide or butylene oxide units per mole of NH function.

The ethylene oxide content of the polyethyleneimines (b) is preferably in the range from 10 to 40 mol, more preferably in the range from 15 to 35 mol and most preferably in the range from 20 to 30 mol of ethylene oxide units per mole of NH function.

Polyethyleneimines which are particularly suitable contain at least 12, especially 20 to 45 and particularly 25 to 40 mol of alkylene oxide units per mole.

The average pre-alkoxylation molecular weight $M_w$ of the polyethyleneimine which forms component (b) is generally in the range from 400 to 25 000 g/mol, preferably in the range from 1 200 to 20 000 g/mol, more preferably in the range from 2 000 to 5 000 g/mol and most preferably about 3 000 g/mol.

The polyethyleneimines (b) are known from WO-A-99/67352 and can be prepared as described therein.

Condensation product of component c):

"Based on" denotes that the condensation product may have been prepared from further reactants as well as A, B and optionally C. Preferably, however, the condensation products herein are prepared only from A, B and optionally C.

Sulphonated aromatics of component A) herein include sulphomethylated aromatics. Preferred sulphonated aromatics are: naphthalenesulphonic acids, phenylsulphonic acids, dihydroxybenzenesulphonic acids, sulphonated ditolyl ethers, sulphomethylated 4,4'-dihydroxydiphenylsulphone, sulphonated diphenylmethane, sulphonated biphenyl, sulphonated hydroxybiphenyl, especially 2-hydroxybiphenyl, sulphonated terphenyl or benzenesulphonic acids.

Useful aldehydes and/or ketones of component B) include especially aliphatic, cycloaliphatic and also aromatic ones. Preference is given to aliphatic aldehydes, particular preference being given to formaldehyde and also other aliphatic aldehydes having 3 to 5 carbon atoms.

Useful nonsulphonated aromatics for component C) include for example phenol, cresol, 4,4'-dihydroxydiphenyl sulphone or dihydroxydiphenylmethane.

Useful urea derivatives include for example dimethylurea, melamin or guanidine.

The preferred condensation product used for component c) is one based on

A) at least one sulphonated aromatic selected from the group consisting of naphthalenesulphonic acids, phenylsulphonic acids, dihydroxybenzenesulphonic acids, sulphonated ditolyl ethers, sulphomethylated 4,4'-dihydroxydiphenylsulphone, sulphonated diphenylmethane, sulphonated biphenyl, sulphonated hydroxybiphenyl, especially 2-hydroxybiphenyl, sulphonated terphenyl and benzenesulphonic acids, B) formaldehyde and optionally C) one or more compounds selected from the group consisting of phenol, cresol, 4,4'-dihydroxydiphenyl sulphone, dihydroxydiphenylmethane, urea, dimethylurea, melamine and guanidine.

The condensation product preferably obtained in the course of the condensation has an average degree of condensation which is preferably in the range from 1 to 150, more preferably in the range from 1 to 20 and especially in the range from 1 to 5.

The condensation products of component c) can be used as an aqueous solution or suspension or as a solid for example as a powder or granulate, preferably as a spray-dried powder or granulate.

Preferred condensation products of component c) have an inorganic salt content of below 10% by weight, preferably below 5% by weight and especially below 1% by weight, based on the aqueous solution or suspension of the component used or based on the solid of component c) used.

It is likewise preferable to use condensation products of component c) which are low in residual monomer or free from residual monomer.

By "low in monomer" is meant a residual monomer content of less than 30% by weight, preferably less than 20% by weight, based on the condensation product, especially <10% by weight, preferably <5% by weight. Residual monomers in this connection are the reactants used for preparing the condensation product.

Such condensation products which are low in salt and low in residual monomer are known for example from EP-A 816 406.

The condensation products of component c) can be prepared as described in EP-A 1 049 745.

The two components b) and c) are together used in an amount which is preferably in the range from 0.1% to 200% by weight and especially in the range from 5% to 60% by weight, based on the pigment of component a).

It is likewise preferable to use components b) and c) in a weight ratio to each other in the range from 1:50 to 20:1 and especially from 1:5 to 1:1.

It is particularly preferable for the pigment preparation according to the invention to contain water or an aqueous medium for component e). Such aqueous pigment preparations preferably comprise 0.2% to 50% and preferably 1% to 35% by weight of at least one pigment of component a)

5% to 40% by weight of components b) and c), and

1% to 88% and preferably 5–60% by weight of aqueous medium.

Aqueous medium is either water alone or a mixture of water with organic solvents which preferably have a water solubility of more than 5 g/l at 20° C.

Useful organic solvents include:

Aliphatic $C_1$–$C_4$ alcohols, linear or branched, pentanediol, aliphatic ketones such as acetone, methyl ethyl ketone, diacetone alcohol, polyols such as ethylene glycol, diethylene glycol, triethylene glycol, polyglycols having a molar mass of 200–2 000 g/mol, propylene glycol, dipropylene glycol, tripropylene glycol, trimethylolpropane, glycerol, thiodiglycol, 2-pyrrolidone, N-methylpyrrolidone, N-ethylpyrrolidone, 1,3-dimethylimidazolidinone, dimethylacetamide and also dimethylformamide.

Mixtures of the solvents mentioned may also be used.

The amount of organic solvent is preferably 0–50% and especially 0–35%. The pigment preparation can further contain viscosity regulators such as for example polyvinyl alcohol, polyvinylpyrrolidone, methylcellulose, xanthans, as long as they have no adverse effect on the stability, the printing performance and the drying performance on paper.

The pigment preparation can contain pH regulators such as NaOH, KOH, aminoethanol, aminomethylpropanol, triethanolamine, N,N-dimethylaminoethanol, diethanolamine or methyldiethanolamine.

The invention further provides a process for producing pigment preparations according to the invention, characterized in that components a) to c) are homogenized together with water, then if necessary freed of coarse particles preferably by means of a 1–10 µm membrane, a glass filter or paper cloth and the pigment preparation is optionally dried.

The homogenizing is preferably effected by beating the individual components in a dissolver and then grinding in a high energy bead mill using zirconium oxide beads for example.

The preparation is then generally filtered, for example through 1–10 µm membrane or glass fiber filters.

The pigment preparations according to the invention exhibit excellent storage stability and provide prints of excellent lightfastness not only on thermal bubble jet (HP, Encad) but also on piezo printers (Epson, Canon, Mutoh). In addition, they have the following advantages:

No clogging of print head and also high water and migration fastness.

The fundamentals of color measurement may be found in:

Farbmessung BAYER Farben Revue, Sonderheft 3/2D (1986).

The aqueous pigment preparations according to the invention are very useful for printing sheetlike or three-dimensionally configured substrates by the ink jet process, which is characterized in that the ink jet inks are printed onto the substrate and the print obtained is then fixed if desired.

The ink jet process is usually carried out with aqueous inks, which are sprayed as small droplets directly onto the substrate. There is a continuous form of the process, in which the ink is pressed at uniform rate through a nozzle and the jet is directed onto the substrate by an electric field depending on the pattern to be printed, and there is an interrupted ink jet or drop-on-demand process, in which the ink is expelled only where a coloured dot is to appear, the latter form of the process employing either a piezoelectric crystal or a heated hollow needle (bubble or thermal jet process) to exert pressure on the ink system and so eject an ink droplet. These techniques are described in Text Chem. Color, Band 19 (8), pages 23 to 29, 1987, and volume 21 (6), pages 27 to 32.

The ink jet inks according to the invention are particularly useful for the bubble jet process and for the process employing a piezoelectric crystal.

When the print is to be fixed, it is possible to proceed in a known manner and as described in WO-A-99/01516 and, for example, for a binder, if desired in the form of a dispersion or emulsion, to be applied atop the printed substrate and cured or for a film to be laminated onto the printed substrate.

Further details concerning these binders are to be found in WO-A-99/01516.

The aqueous pigment preparations according to the invention can be printed on all kinds of substrate materials. Examples of substrate materials include coated or uncoated cellulosics such as paper, paperboard, cardboard, wood and woodbase, coated or uncoated metallic materials such as foils, sheets or workpieces composed of aluminium, iron, copper, silver, gold, zinc or alloys thereof, coated or uncoated silicatic materials such as glass, porcelain and ceramics, polymeric materials of any kind such as polystyrene, polyamides, polyesters, polyethylene, polypropylene, melamin resins, polyacrylates, polyacrylonitrile, polyurethanes, polycarbonates, polyvinyl chloride, polyvinyl alcohols, polyvinyl acetates, polyvinylpyrrolidones and corresponding block and nonblock copolymers, biodegradable polymers and natural polymers such as gelatin, textile materials such as fibres, yarns, threads, knits, wovens, nonwovens and made-up product composed of polyesters, modified polyester, polyester blend fabric, cellulosics such as cotton, cotton blend fabric, jute, flax, hemp and ramie, viscose, wool, silk, polyamide, polyamide blend fabric, polyacrylonitrile, triacetate, acetate, polycarbonate, polypropylene, polyvinyl chloride, polyester microfibres and glass fiber fabric, leather—both natural and artificial—in the form of smooth leather, nappa leather or suede leather, comestibles and cosmetics.

The aqueous recording fluids (inks) are preferably obtained by adjusting the pigment preparations obtained by the process according to the invention to the desired colour strength by addition of water and/or organic solvents.

The invention is further described via the following illustrative but non-limiting examples.

EXAMPLES

Base fluid for pigment ink printing tests:

15% of 1,5-pentanediol

10% of polyglycol 200

5% of 2-pyrrolidone

70% of completely ion-free water

Example 1

7.7 g of an ethoxylated-propoxylated polyethyleneimine (having a 1.1% base nitrogen content, a 63% polyoxyethylene content and a 1% polyoxypropylene content) and 25 g of a low-salt naphthalenesulphonic acid-formaldehyde condensate (having an average molar mass of 1 000–1 500 g/mol) were dissolved in 380 g of completely ion-free water. Then 90 g of an acidic gas carbon black having a BET surface area of 180 $m^2/g$ and a pH of <4.5 for a 5% aqueous slurry of Spezialschwarz 4 (Degussa) were stirred in using a dissolver until the entire carbon black had been wetted. The pH was adjusted to about 7.5 with ethanolamine.

The suspension was then introduced into an open 1 l stirred media mill (from Sussmeier, Brussels) and ground using 1.1–1.4 mm zirconium oxide beads for 1 hour with cooling. The pH was readjusted if necessary during grind ing. This pigment preparation was finished to form a printing ink:

6.94 g of pigment preparation and 18.06 g of base fluid were mixed, filtered through 5 μm and printed with an HP 890 printer onto normal and premium paper.

The Y values measured in the Cielab system were 4.4 on normal paper and 2.2 on premium paper. Restarting printing after 24 h did not present any problems.

Y is a lightness parameter in the Cielab system and thus a measure of the colour strength of carbon blacks. The smaller the value, the blacker (i.e. stronger) the carbon black on the substrate (paper in this instance).

Example 2

85 g of an oxyethylated-oxypropylated polyethyleneimine (with 3% base nitrogen, 55% polyoxyethylene, 3% polyoxypropylene with an average molar mass of 800 g/mol) and 330 g of a desalted naphthalenesulphonic acid-formaldehyde condensate (average molar mass 1 200 g/mol) were dissolved in 3 300 g of completely ion-free water. Then 1 250 g of Spezialschwarz 4 (Degussa) were stirred in using a dissolver and the pH was adjusted to 7.5 with ethanolamine. The dispersion was then ground in an Advantis V-15 recirculation bead mill using 0.6–0.8 mm zirconium silicate beads for 60 minutes with cooling. The pH was readjusted as necessary during grinding.

5 g of pigment preparation and 20 g of base fluid were mixed, filtered through 5 μm and printed on an HP 6122 printer onto normal and premium paper.

The Y values measured in the Cielab system were 4.2 on normal paper and 1.9 on premium paper. Printing restart after 24 h was possible without problems.

Example 3

20 g of desalted naphthalenesulphonic acid-formaldehyde condensate (average molar mass 1 000 g/mol), 6.5 g of an oxyethylated-oxypropylated polyethyleneimine (1.1% base nitrogen, 63% oxyethylene fraction, 1% oxypropylene fraction) were dissolved in 400 g of completely ion-free water and 75 g of Spezialschwarz 4 were gradually stirred in using a dissolver. The pH was adjusted to 7.5 with ethanolamine.

The suspension was then introduced into an open 1 l stirred media mill (from Sussmeier, Brussels) and ground using 1.1–1.4 mm zirconium oxide beads for 1 hour with cooling. The pH was readjusted if necessary during grinding. This pigment preparation was finished to form a printing ink:

8.33 g of pigment preparation and 16.67 g of base fluid were mixed, filtered through 5 μm and printed with an Epson 760 printer onto normal and premium paper.

The Y values measured in the Cielab system were 5.2 on normal paper and 1.7 on premium paper. Restarting printing after 24 h did not present any problems.

Example 4

15.4 g of an oxyethylated-oxypropylated polyethyleneimine (1.1% base nitrogen, 63% oxyethylene fraction, 1% oxypropylene fraction) and 32 g of desalted naphthalenesulphonic acid-formaldehyde condensate (molar mass 1 100 g/mol) were dissolved in 214.8 g of completely ion-free water and 140 g of Pigment Blue 15 were stirred in using a dissolver.

The pH was adjusted to 7.5 with ethanolamine.

The suspension was then introduced into an open 1 l stirred media mill (from Sussmeier, Brussels) and ground using 0.6–0.8 mm zirconium oxide beads for 2 hours with cooling. The pH was readjusted if necessary during grinding.

This pigment preparation was finished to form a printing ink:

1.43 g of the pigment preparation were mixed with 23.57 g of the base fluid, filtered through 5 μm and printed using an HP 890 printer onto HP normal (CHP 210) and premium paper. The brilliant print was streak free and a restart of printing was readily possible.

The colour locus was: L=62, a=−11, b=−45, C=46 on normal paper and L=55, a=−16.4, b=−48 and C=51 on premium paper.

Example 5

5 g of an oxyethylated-oxypropylated polyethyleneimine (with 3% base nitrogen and 55% oxyethylene fraction and 3% oxypropylene fraction and an average molar mass of 800 g/mol) and 20 g of desalted naphthalenesulphonic acid-formaldehyde condensate (average molar mass 1 000 g/mol) were dissolved in 229 g of completely ion-free water. Then 246 g of water-moist C.I. Pigment Yellow 150 presscake having a solids content of 50.8% were stirred in using a dissolver. The pH was adjusted to 7.5 with triethanolamine.

The suspension was then introduced into an open 1 l stirred media mill (from Sussmeier, Brussels) and ground using 0.6–0.8 mm zirconium oxide beads for 2 hours with cooling.

The pH was if necessary readjusted during grinding.

This pigment preparation was finished to form a printing ink:

1.5 g of the pigment preparation were mixed with 23.5 g of the base fluid, filtered through 5 μm and printed onto normal and premium paper using an HP 6122 printer.

The normal paper colour locus was: L=91, a=−5.4, b=60.5 the premium paper colour locus was: L=88.6, a=−5.2, b=74.4.

The brilliant print was streak free and a restart of printing was readily possible.

Example 6

6 g of an oxyethylated-oxypropylated polyethyleneimine (1.1% base nitrogen, 63% oxyethylene fraction, 1% oxypropylene fraction) and 26 g of desalted naphthalenesulphonic acid-formaldehyde condensate (average molar mass 1 100 g/mol) were dissolved in 266.8 g of completely ion-free water.

100 g of Pigment Red 122 were then stirred in on a dissolver and the pH was adjusted to 7.5 with triethanolamine.

The suspension was then introduced into an open 1 l stirred media mill (from Sussmeier, Brussels) and ground using 0.6–0.8 mm zirconium oxide beads for 2 hours with cooling. The pH was if necessary readjusted during grinding.

This pigment preparation was finished to form a printing ink:

2 g of the pigment preparation were mixed with 23 g of the base fluid, filtered through 5 μm and printed onto normal and premium paper using an HP 890 printer.

The brilliant print was streak free and a restart of printing was readily possible.

The normal paper colour locus was: L=53, a=52, b=−17 C=54.4 the premium paper colour locus was: L=44.5, a 62.3, b=−10 C=63.1.

COMPARATIVE EXAMPLE

Oxalkylated Polyethyleneimine Only 415 g of an oxyethylated-oxypropylated polyethyleneimine (with 1.1% base nitrogen, 63% polyoxyethylene, 1% polyoxypropylene) were dissolved in 3 300 g of completely ion-free water. Then 1 250 g of an acidic gas carbon black having a BET surface area of 180 $m^2/g$ (pH of a 5% slurry is <4.5) were stirred in using a dissolver and the pH was adjusted to 7.5 with ethanolamine.

The dispersion was then ground in an Advantis V 15 recirculation bead mill using 0.6–0.8 mm zirconium silicate beads for 60 minutes. The pH was readjusted if necessary during grinding.

5 g of pigment preparation and 20 g of base fluid were mixed, filtered through 5 μm and printed on an HP 6122 printer onto normal and premium paper.

The Y values measured in the Cielab system were 9.5 on normal paper and 3 on premium paper. Compared with the Y values achieved in Example 2, the dispersants combination according to the invention is thus distinctly better than the use of the alkoxylated polyethyleneimine alone as described in DE-A-100 26 466.

What is claimed is:

1. Pigment preparations comprising
   a) at least one pigment,
   b) at least one polyethyleneimine which is alkoxylated, and
   c) at least one condensation product based on
      A) sulphonated aromatics,
      B) aldehydes and/or ketones and optionally
      C) a compound selected from the group consisting of nonsulphonated aromatics, urea and urea derivatives.

2. Pigment preparations according to claim 1, comprising as component b) an alkoxylated polyathylefleimifle which has 1–10 mol of propylene oxide or butylefle oxide units and 10–40 ethylene oxide units per NH function.

3. Pigment preparations according to claim 1, wherein the polyethyleneimine used in component b) has an average pre-alkoxylation molecular weight of 400–25 000 g/mol.

4. Pigment preparations according to claim 1, containing components b) and c) in an amount of 0.1% to 200% by weight, based on the pigment of component a).

5. Pigment preparations according to claim 1, containing an aqueous medium, in an amount of 1% to 98% by weight, as an additional component e).

6. Pigment preparations according to claim 1, wherein the polyethyleneimine is ethoxylated end propoxylated and/or butoxylated.

7. Process for producing pigment preparations according to claim 1, comprising homogenizing
   a) at least one pigment,
   b) at least one polyethyleneimine which is alkoxytated, and
   c) at least one condensation product based on
      A) sulphonated aromatics,
      B) aldehydes and/or ketones and optionally
      C) a compound selected from the group consisting of nonsulphonatad aromatics, urea and urea derivatives
   in the presence of water, and optionally freeing the resulting homogenized compounds of coarse particles and optionally drying the resulting pigment preparation.

8. A process for prepaing sheets or three-dimensionally configured substrates by ink jet processes comprising printing thereon the pigment preparations according to claim 1.

* * * * *